United States Patent [19]

Thill et al.

[11] Patent Number: 5,064,295
[45] Date of Patent: Nov. 12, 1991

[54] DEVICE FOR CONTINUOUSLY MEASURING THE TEMPERATURE OF A MOLTEN METAL

[75] Inventors: Fernand Thill, Esch/Alzette; Carlo Schoumacher, Niedercorn, both of Luxembourg

[73] Assignee: Arbed S.A., Luxembourg

[21] Appl. No.: 520,531

[22] Filed: May 8, 1990

[30] Foreign Application Priority Data

May 17, 1989 [LU] Luxembourg .............. 87522

[51] Int. Cl.$^5$ .................... G01K 1/12; G01K 1/00
[52] U.S. Cl. .................... 374/139; 374/140; 374/208
[58] Field of Search .............. 374/139, 140, 208, 158; 136/234

[56] References Cited

U.S. PATENT DOCUMENTS

| | | |
|---|---|---|
| 2,397,901 | 4/1946 | Zimmerman .................. 374/139 X |
| 3,264,874 | 8/1966 | Fischer ..................... 374/139 |
| 3,364,745 | 1/1968 | Fetner et al. .................. 374/140 |
| 3,946,610 | 3/1976 | Santorius ..................... 374/139 |
| 4,358,630 | 11/1982 | Falk ..................... 374/139 |
| 4,396,792 | 8/1983 | Falk ..................... 374/139 |
| 4,430,518 | 2/1984 | Nakajima et al. .............. 374/139 X |
| 4,444,516 | 9/1984 | Dostoomian et al. .......... 374/208 X |
| 4,776,705 | 10/1988 | Nayjar et al. .................. 374/139 |

FOREIGN PATENT DOCUMENTS 800690  1/1981  U.S.S.R. ..................... 374/139

*Primary Examiner*—David Trafton
*Assistant Examiner*—Joseph A. Rhoa
*Attorney, Agent, or Firm*—Fishman, Dionne & Cantor

[57] ABSTRACT

A device for monitoring the temperature of a molten metal is disclosed. The device includes a probe for contacting the molten metal, a refractory support for mounting the probe within an aperture defined through a wall of a metallurgical vessel and a sensor for sensing the temperature of the probe means.

8 Claims, 1 Drawing Sheet

DEVICE FOR CONTINUOUSLY MEASURING THE TEMPERATURE OF A MOLTEN METAL

TECHNICAL FIELD

The present invention concerns a device which allows the continuous measuring of the high temperature of a liquid metal bath, more particularly of a bath of steel or of hot metal contained in a vessel of the kind currently used in ironmaking and steelmaking, such as a ladle, a converter or a continuous casting tundish.

BACKGROUND OF THE INVENTION

During a metallurgical process, e.g. a refining process, it is important for the operator to know at any moment the correct temperature of the metal bath. Indeed, the temperature is one of the main parameters which the operator needs for drawing his conclusions about the correct evolution of such a process. The continuous knowledge of this temperature has become even more important as the temperature constitutes one of the main parameters in computer programs which allow the operator to continuously monitor and control the processes. The use of the technical data provided to the operator by those computer programs, puts him in a position to intervene in the process. Accurate data with regard to temperature may be of critical importance during certain phases of a refining process, e.g. when there is a risk for the temperature of a metal bath to fall below a minimum value. For example, in the case of a continuous casting tundish, the temperature of the steel bath must be maintained above a given minimum temperature, characteristic of the steel composition, to insure castability of the steel bath. Also, the quality of given semifinished or finished products may, in certain cases, depend on the invariability of the temperature of the steel or of the iron during the casting operation.

Presently, several methods are known which allow to measure the temperature of a liquid metal bath. A widespread method uses a movable lance which includes an exchangeable and consumable temperature sensor. The lower part of this lance is introduced intermittently into the bath in view of measuring the temperature thereof. The main disadvantage of this method lies in the fact that the device does not allow to measure the temperature in a continuous manner over the whole duration of a manufacturing or of a treatment process, usually due to the consumption of the sensor and/or of the lance. Additionally, the introduction of the lance into the reactor during the course of the process might disturb the normal evolution of the process or result in a complete consumption of the lance body if oxygen blowing is involved. For these reasons measuring of the temperature can only be achieved during a normal or intentional interruption of the treatment process.

According to another known method, it is foreseen to incorporate into the refractory lining of a metallurgical vessel a hollow casing of refractory material, the measuring head of e.g. a thermocouple, being located in the interior of this casing. Although this method allows to make continuously measurements of the temperature of a metal bath, the principal drawback of this approach lies in the fact that the normally utilized protection casings, made of conventional refractory material, have usually to sustain a heavy wear and are rapidly deteriorated, particularly in the presence of corrosive slag. For this reason measurements can only be made during a limited time period prior to the exchange of a worn device by a new one, normally during the relining of the vessel. Additionally the measurements of the temperature are liable to be falsified as a result of the uncontrolled wear of the device casings and of unprecise adjustments of the sensor part within the casing.

The aim of the present invention is to imagine a device for measuring the temperature of a metal bath, this device being free from the drawbacks of the other known measuring methods and this device allowing to make accurate measurements in a continuous manner without disturbing the running process. The measuring device according to the invention should be conceived in such a way that the risk of damage by the metal bath or by the slag is reduced and that the replacement of the exchangeable device has to be made only after prolonged time intervals, e.g. during the renewal of the refractory lining of the metallurgical vessel.

SUMMARY OF THE INVENTION

This aim is achieved with the help of the measuring device according to the invention such as it has been characterized through the main claim. Preferred execution embodiments have been described in the dependent claims.

A substantial advantage provided by the measuring device according to the invention lies in the fact that the device is extremely reliable, that it is of a relatively low price and that it can easily be replaced during a campaign, while at least a part of the elements constituting the device can be recuperated and reused.

DETAILED DESCRIPTION OF THE INVENTION

Figure 1:
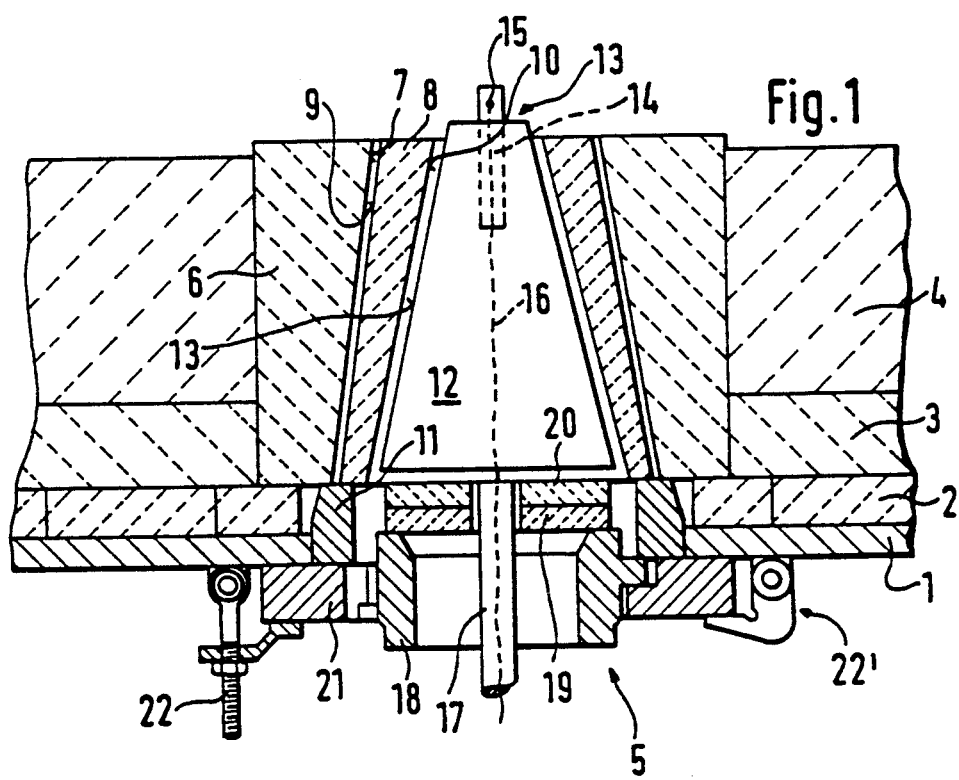
FIG. 1 constitutes a sectional view through a measuring device according to the invention such as installable in the bottom part or in the lateral wall of a metallurgical vessel.

In FIG. 1 one distinguishes the outer steel plate wall 1 of a metallurgical vessel. This wall is covered by several layers of refractory material, constituted in this case for example by the security or permanent layers 2 and 3 of refractory bricks and by the wearing layer 4 also built with bricks of a refractory material. These layers or parts thereof can be constituted by refractory materials of different thermal conductivity, depending on whether one wishes to promote or to diminish the heat transfer in given areas. The temperature measuring device 5 according to the invention is lodged in a seat brick 6 constituted preferably by a hollow refractory block provided with an inner wall 7 having the form of a frustrum of a cone. The interior of the seat brick 6 is fitted out with a sleeve 8 made of a refractory material having a thermal conductivity which is smaller than that of the seat brick 6. The outer wall 9 of the sleeve 8 follows the form of the inner wall 7 of the seat brick 6, whereas the inner surface 10 of the sleeve 8 has the form of a frustrum of a cone with an inclination angle (intersection of the wall with the vertical plan) slightly greater than that of the outer wall 9. The sleeve 8 is kept in its position by a concrete and by a steel ring 11.

The temperature measuring device 5 itself is constituted, according to the embodiment illustrated by FIG.

1, mainly by a support 12 and by a measuring head lodged therein. The support 12 has the form of a frustrum of a cone and its outer surface 13 fits the form of the inner surface 10 of the sleeve 8. This support 12 shelters in its smaller foot part the measuring head comprising a cylindrical probe 14 is received in the truncated cone support 12, so that its axis coincides with that of the truncated cone and that of its extremities slightly projects from the smaller foot part of the truncated cone body 12 in order to plunge with its closed nose part in the liquid bath.

According to the preferred embodiment of the invention the ceramic probe 14 is made of boron nitride. This is one of the materials possessing very good thermal conductivity together with a high electric resistivity. These characteristics allow incorporation of a sensor, e.g. the hot junction of a thermocouple, straight into the sleeve in direct and continuous contact with the boron nitride without any supplementary dielectric protection. Boron nitride provides further advantages in that it is nearly insensitive to thermal shocks, it shows a good resistance to oxidation and it is not wetted by the steel and by the slag. Due to all these properties the protection sleeve is longlasting and reliable, Moreover, the boron nitride can be easily machined with conventional tools.

In the example shown in FIG. 1 the sensor chosen to measure the temperature is a thermocouple, It is however, also possible to use other means allowing to obtain a correct and continuous perception and indication of the temperature. So, in another embodiment is foreseen to use a probe 14 which has the form of a hollow cylinder closed at one extremity so as to form a cavity constituting a full radiator and to proceed to the measurement of the temperature with the help of photodetection and phototransmission means such as optical fibers.

In FIG. 1 the sensor 15 is linked to display and/or recording instruments, which are located at a certain distance apart from the metallurgical vessel in a control cabin or room. This connection is obtained through the intermediary of the conductor cable 16, which crosses the truncated cone support 12 and a coupling tube 17 and which ends in the instruments.

The shape of the support 12 has been chosen intentionally so as to be easily adjustable and retractable in view of a rapid exchange. The support 12 is kept in its position with the help of a metal socket 18 which includes a bayonet holding mechanism. This mechanism presses the support 12 against the sleeve 8 through the two interposed refractory rings 19 and 20, at least one of those rings being made out of a compressible refractory material. The retention of the socket 18 is realized with the help of a steel ring 21. This steel ring 21 is mounted in an easily removable way to the steel plate wall 1 of the metallurgical vessel with positioning and clamping means 22 and 22'. If required, a water cooling circuit can be integrated as well in the socket 18 as in the steel ring 21.

According to another embodiment an appropriately shaped probe 14, together with the integrated temperature measuring sensor 15, is directly introduced into a boron nitride sleeve and can thus be easily and rapidly exchanged if it happens that the device becomes mechanically damaged before the end of a campaign of the refractory lining of a metallurgical vessel. With such an embodiment it is also possible to temporarily remove or to partially retract the probe 14 during process steps which might otherwise result in damage to the probe, for example during the charging of solid products, such as scrap or alloying metals, into the metallurgical vessel.

Figure 2:
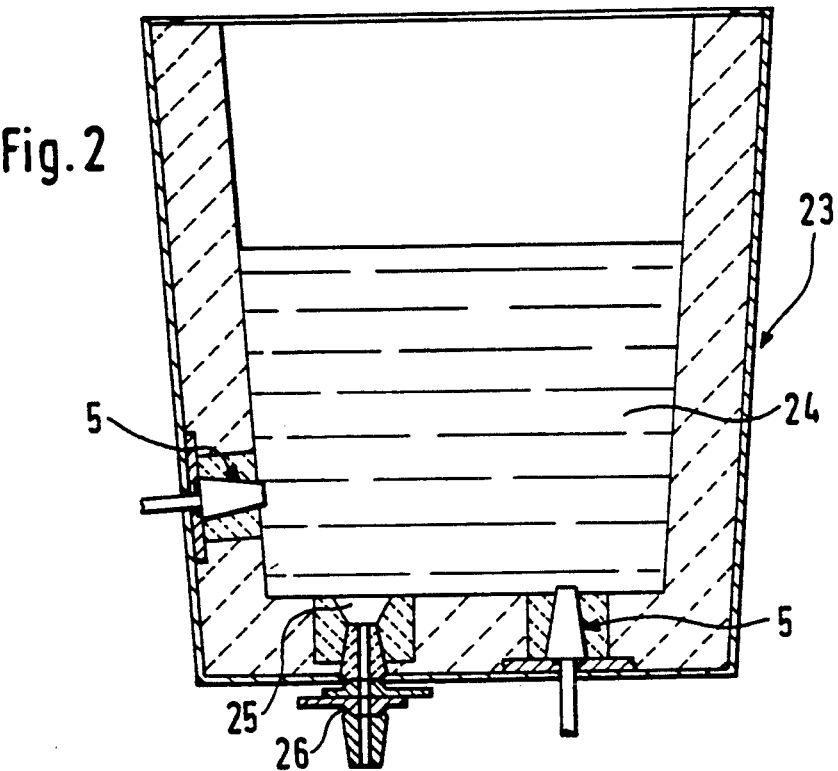
FIG. 2 represents a section through a metallurgical ladle which comprises several measuring devices according to the invention.

FIG. 2 illustrates a ladle 23 containing a liquid steel bath 24. A tapping aperture 25 in the bottom of the ladle 23 is closed by a sliding casting nozzle 26. FIG. 2 shows two temperature measuring devices 5 of the kind exemplified by FIG. 1. Those devices are located one in the bottom and the other in the lateral wall of the ladle 23. The integration into the vessel wall of two or of more measuring devices according to the invention on different points of said wall improves the representativity of the measurements. It will be understood that values registered by one or by more measuring devices may be fed via appropriate interfaces to a computer used to control and to monitor the manufacturing and/or treatment processes performed in metallurgical vessels.

While preferred embodiments have been shown and described, various modifications and substitutions may be made thereto without departing from the spirit and scope of the invention. Accordingly, it is to be understood that the present invention has been described by way of illustrations and not limitations.

What is claimed is:

1. A device for monitoring the temperature of a molten metal, said molten metal being disposed within a metallurgical vessel having a refractory lining, comprising:

tubular probe means having a closed end for contacting said molten metal, said probe means exhibiting high thermal conductivity and high electrical resistivity;

refractory support means for mounting said probe means within a passage through the refractory lining of said metallurgical vessel, said support means and said passage having complimentary frustoconical profiles;

refractory sleeve means for defining the passage through the refractory lining of metallurgical vessel, said sleeve means including an inner surface defining said passage and an outer surface for contacting said lining, wherein said refractory lining includes a refractory brick member including an inner surface for receiving the sleeve means, said inner surface of said brick member and said outer surface of said sleeve member have complimentary frustoconical profiles, the frustoconical profiles of the support means and the inner surface of the sleeve means exhibit a first angle of inclination, the frustoconical profiles of the outer surface of the sleeve and the inner surface of the brick member exhibit a second angle of inclination and the second angle of inclination is greater than the first angle of inclination; and sensor means, disposed within said tubular probe means and in contact with said closed end, for sensing the temperature of the closed end.

2. The device of claim 1, wherein the sensor means comprises a thermocouple.

3. The device of claim 1, wherein the probe means comprises a ceramic material.

4. The device of claim 3, wherein the probe means comprises boron nitride.

5. The device of claim 1 further comprising cable means for conducting signals from said sensor means.

6. The device of claim 1, wherein the metallurgical vessel includes a steel outer wall, further comprising clamp means, removably securable to said steel outer wall, for securing said refractory sleeve and refractory support means within the passage through the refractory lining of the metallurgical vessel.

7. The device of claim 1, wherein the vessel defines an internal volume and wherein the closed end of the probe means protrudes from the support means into the internal volume of said metallurgical vessel.

8. The device of claim 1, wherein the sensor means comprise a black body sensor including:
- an inner cavity defined within the tubular probe means; and
- phototransmission means for detecting radiation within the inner cavity.

* * * * *

UNITED STATES PATENT AND TRADEMARK OFFICE
CERTIFICATE OF CORRECTION

PATENT NO. : 5,064,295

DATED : November 12, 1991

INVENTOR(S) : THILL ET AL

It is certified that error appears in the above-identified patent and that said Letters Patent is hereby corrected as shown below:

Column 4, line 36, change "frustoconical" to --frustroconical--.

Column 4, line 46, change both occurances of "frustoconical" to --frustroconical--.

Column 4, line 49, change "frustoconical" to --frustroconical--.

Signed and Sealed this

Twenty-eighth Day of April, 1992

Attest:

HARRY F. MANBECK, JR.

*Attesting Officer*   *Commissioner of Patents and Trademarks*